Patented Aug. 30, 1927.

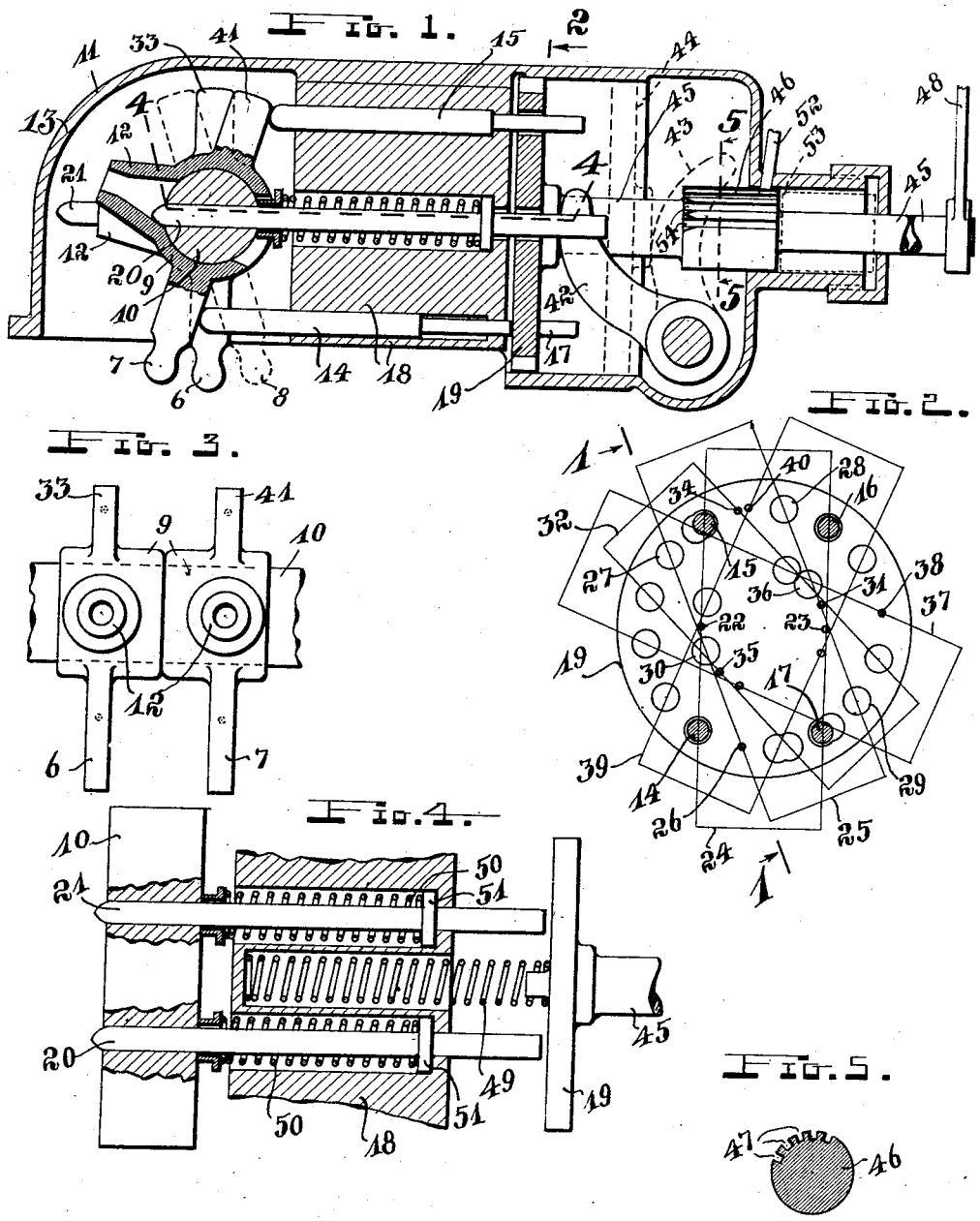

1,640,872

UNITED STATES PATENT OFFICE.

VERNON W. BALZER AND JOHN McK. BALLOU, OF LOS ANGELES, CALIFORNIA.

SPEED-SELECTING DEVICE.

Application filed July 16, 1923. Serial No. 651,852.

This invention relates to devices used in selecting a desired speed through meshing suitable gears and other power and motion transmitting means.

Gears, as, for instance, in the transmission of an automobile, are quite commonly arranged so that certain of the gears may be moved into mesh or into engagement with one another while normally disengaged or in inoperative relation to one another, for the purpose of producing a change or difference in the motion or power passing through the gears.

One of the objects of this invention is to provide a selecting device of simple construction with positive selecting means to avoid mistakes.

Another object is to provide locking means for keeping the selecting mechanism in certain operative relation during the operation of the selecting mechanism.

Another object is to produce close co-operation between the selecting mechanism and the change producing means through loosely disposed push-rods.

Another object is to provide means in the selecting mechanism whereby the change producing means can be neutralized unaffected by the push-rods.

Other objects will appear from the following description and appended claims as well as from the accompanying drawing, in which—

Fig. 1 is a longitudinal, partly midsectional view, and partly a view taken on the line 1—1 of Fig. 2, to illustrate the operative relation of different parts of a simple construction designed in accordance with the principles of the invention.

Fig. 2 is a diagrammatic illustration of different positions and operations possible in connection with the selecting disc illustrated in Fig. 1, considered in the direction of the arrow 2.

Fig. 3 is a front elevation of the two changing levers, illustrated in Fig. 1.

Fig. 4 is a fragmentary sectional view on line 4—4 of Fig. 1, at about right angles to the illustration of Fig. 1.

Fig. 5 is a cross section through the locking head on line 5—5 of Fig. 1.

Considering this invention in connection with a very common form of gear shifting, already referred to above, that is, the selective gear shift transmission of an automobile, it will easily be understood that the changing levers or change-producing levers 6 and 7, indicated in Figs. 1 and 3, can be arranged so as to actuate the shiftable gears of such a transmission, without further illustrating such interconnection.

The lever 7 is illustrated in a shifted position, while the lever 6 is illustrated in normal inoperative or neutral position. Both levers may be moved to neutral position, and either of the levers may be moved to the position in which the lever 7 is illustrated in Fig. 1 as well as to a position indicated in dotted lines at 8. Such a moving would correspond to the shifting of the most common form of selective gear shift of automobiles, that is, the so-called four-speed gear shift, one lever producing the so-called reversed and the so-called slow speed, while the other lever produces the so-called intermediate and the so-called high speed for the automobile.

Both levers are provided with a hub 9, swingably mounted on the stationary pin 10.

The pin 10 is disposed in the casing 11, which also incloses the whole mechanism as illustrated in the drawing, in this simple form.

Each of the levers is provided with a hollow conical extension end 12, projecting from the hub of the levers.

To simplify the explanation of the illustrated form of the device, the end 13 of the casing will hereafter be referred to as the forward end, and motions and movements in the direction toward this end 13 will hereafter be called forward movements, while movements in the opposite direction will hereafter be called rearward movements. The lever 7 is, therefore, illustrated as moved forwardly.

Assuming that the lever 7 be used for the reverse and slow forward movement of an automobile gear shift, and that the lever 6 be used for the second and third or high gear of such a gear shift, the lever 7 could then be said to be shifted or moved for the slow forward gear.

The shifting or moving of the levers 6 and 7 is accomplished by means of the plain push-rods 14, 15, 16 and 17, normally in the positions indicated in Fig. 2. These rods are shiftably disposed in the stationary block or supporting member 18.

The selecting disc 19 is provided with a number of apertures or perforations, to allow the push-rods to pass through the forward-moving selecting-disc when not selected for action or operation. In certain positions one of the push-rods abuts against an unperforated portion of the selecting disc, so that such a rod will be compelled to move forward with the then forward moving selecting disc, thereby actuating one of the levers 6 or 7.

There are other rods, which may be properly designated as neutralizing rods. As long as only two levers are used in the device, only two neutralizing rods are required for the whole device. If more gear-shift levers are arranged in the device, more neutralizing rods may be provided also, as will easily be understood.

More push-rods may also be provided, in case that more than two operating or shift levers are provided in this device. It will easily be understood that such and other similar slight modifications do not affect the invention, and that we do not wish to limit ourselves to the specific design illustrated in the drawing, the form of the device in the drawing being merely given to illustrate the principles of the invention.

In the form of Fig. 1 it is desirable that both levers can be neutralized. This can be accomplished by means of the neutralizing rods 20 and 21. The hollow conical extension end of each of the levers is provided for this purpose. The rod 20 is illustrated in a position that the lever 7 is free to swing around the stationary pin 10, while the rod 21 is illustrated moved to its forward position, projecting through the conical end of the lever 6, thereby locking the lever 6 in its neutral position against any movement in either direction under these conditions.

In its normal inoperative or neutral position, the selecting disc 19 is disposed so that both neutralizing rods abut against an unperforated portion of the disc, at points indicated at 22 and 23 in Fig. 2.

From the above it will be clear that in the inoperative or neutral position of the selecting disc, the neutralizing rods are in a position that they will be pushed forward by the forward moving selecting disc, while all push-rods remain unaffected by reason of the fact that all push-rods can pass through the disc, as indicated at 14, 15, 16 and 17 in Fig. 2. Both operating or shifting levers 6 and 7 can in this manner be neutralized by a forward moving of the selecting disc under these conditions.

The neutral position of the disc, embodying the neutral positions of all rods, is represented by the rectangular figure, indicated at 24 in Fig. 2.

In a similar manner, it may be said that the rectangular figure, indicated at 25, includes diagrammatically the different positions of the several rods in relation to the selecting disc with reference to the slow forward gear-shift, above referred to, rod 14 being caused to abut against the unperforated portion of the disc at 26, rod 15 being allowed to pass through the disc at 27, rod 16 being allowed to pass through the disc at 28, rod 17 being allowed to pass through the disc at 29, rod 20 being allowed to pass through the disc at 30, and rod 21 being caused to abut against the disc at 31, all combining to accomplish the shifting illustrated in Fig. 1.

Similarly it may be stated that the rectangular figure, indicated at 32, represents a diagram of all the positions of the several rods in relation to the disc 19, the upper extension end 33 of the lever 6 being pushed by the rod 16 since caused to abut against an unperforated portion of the disc at 34, while all other push-rods are allowed to pass through the disc, the lever 7 being neutralized by the rod 20 since caused to abut against the disc at 35, while the rod 21 is allowed to pass through the disc at 36 thereby allowing the lever 6 to swing freely around the stationary supporting pin 10. Second speed is thus obtained.

The figure 37 represents in a similar manner a diagram of all positions for the third or high speed of the several rods, the lever 6 being moved forward by the rod 17 since caused to abut against the disc at the unperforated portion at 38.

The so-called reverse gear of the automobile gear-shift, referred to above, is obtained through the positions represented in the diagram of the rectangular figure indicated at 39, the lever 7 being caused to move backward by having the rod 15 abut against an unperforated portion of the disc at 40 thereby causing a pushing of the rod 15 against the upward extension end 41 of the lever 7.

The selecting disc 19 is actuated by the operating cam 42, illustrated in its forward position in Fig. 1; its normal, inoperative, or neutral position being indicated in dotted lines at 43. The relative neutral position of the selecting disc is indicated in dotted lines in Fig. 1 at 44. The selecting disc is provided with a rearwardly extending stem 45, for guiding and setting the disc. A locking head 46 is provided near the rear end of the stem for keeping the stem 45 and thereby the disc in the selected position during the shifting operations. This head 46 is provided with a number of locking means 47, corresponding to the number of positions desired in a particular device, that is, in case of gear shifting, corresponding to the number of different gear-meshing to be accomplished in addition to the normal neutral position; with the common four-speed gear-shift of automobiles, five positions being required, or, in other words, five distinctive locking means 47 on the head 46, as more clearly illustrated in Fig. 5. A lever 48 is illustrated at the end of the stem 45, to be used in procuring the setting of the stem and thereby a selecting of the different positions of the disc in relation to the several rods. In an automobile, this lever 48 may be operated from the steering wheel or the dash-board, as will easily be understood without further illustration of minor connections suitable for such purposes. The operating cam 42 may be operated in conjunction with the clutch of an automobile or in a separate manner, and we wish it understood that we do not limit ourselves to any particular details in regard to such minor details.

A spring 49 is illustrated in Fig. 4, disposed between the stationary member or block 18 and the disc 19, for normally holding the disc in neutral position and for returning the disc to neutral position when not acted upon.

Springs are also illustrated as disposed between the stationary supporting pin 10 and the neutralizing rods 20 and 21, as indicated at 50 in Fig. 4, the rods 20 and 21 being illustrated with shoulder portions 51 to abut against the ends of the springs 50. But these springs are not absolutely necessary, as long as the ends of the rods 20 and 21 are maintained in positions or at points within the conical portion of the extension ends 12 of the levers 6 and 7. In Fig. 1, the rod 21 is illustrated as being pushed through the extension end of the lever 6, and the front termination of the inner conical portion of the extension end 12 of the lever 7 is illustrated as being continued by a practically cylindrical portion within the termination; but it will easily be understood, this arrangement is not absolutely necessary, and, by keeping the shifting movement of the rods 20 and 21 within the conical portion, the rods may easily be pushed back to neutral position by the swinging actions of the levers 6 and 7, considering the position of the rod 20 in relation to the conical portion of the extension end 12 of lever 7.

A pin 52 is illustrated in Fig. 1 for engaging the locking means 47 of the locking head 46 of the disc-stem 45. The head 46, however, is fully disengaged from the pin 52 when the head reaches its rear position as indicated in dotted lines at 53. When the head 46 is moved back to a point that it is not in operative engagement with the locking pin 52, the head with the stem and the disc can be turned freely for setting and selecting purposes. It will easily be understood that the head can be made of a length, and that the head 46 can be disposed at a point to free the stem and disc while the neutralizing rods are still actuated or in neutralizing position, and that the selecting rods can be made of a length to free the levers before the neutralizing rods are fully released.

In the front end of the head 46, the locking means 47 are preferably reduced to nearly pointed form, so that the spaces are widened. This serves as a self-correcting means for the selector. When the stem, and therewith the head 46, is set to a certain selected position, and if the locking pin 52 is not exactly at a point to easily slip between two adjacent locking means on the head, the head is easily forced around as the pin passes into the space along the curved and pointed ends of the locking means 47 to correct the position of the selecting disc through this slight turning of the head 46 and stem 45. Before the disc 19 reaches the operating or selecting rods, the disc is in this manner adjusted and corrected to a certain selecting position, thereby preventing an engagement of pins or rods that are not intended to cooperate.

Such self-correcting also tends to show to the operator. A slight incorrectness in the setting of the lever near the operator's stand might pass unobserved, but a sudden moving to a next position in the operator's handles, by reason of the self-adjusting and self-correcting within the mechanism, is not so easily overlooked, as will easily be understood without further illustration and description.

Having thus described our invention, we claim:

1. In a speed selecting device, shifting levers swingably mounted, operating rods shiftably mounted for shifting movements in the direction of and in alignment with the shifting levers, and a selecting mechanism including a selecting disc having perforations to allow the several operating rods to pass through the disc to remain unaffected by a forward moving of the disc and adapted to cause one of the operating rods at a time to abut against an unperforated portion of the disc for actuating one of the said levers.

2. In a speed selecting device, shifting levers having actuating and neutralizing means, actuating members disposed to contact with the actuating means of said levers, and a selecting member embodying contacting and non-contacting means disposed for movements towards and adapted to thereby contact with the actuating members by which certain of the actuating members can be moved to actuate certain of the levers and by which another actuating member can be moved to engage with the neutralizing means of another lever and adapted to have still other actuating members unaffected.

3. In a speed selecting device of the class described, a shifting lever having supporting means by which the lever can be held to swing around a certain axis and having actuating means facing crosswise to said axis and having furthermore actuating controlling means with an axis crosswise and radially to the first-named axis and embodying actuating surfaces facing the last-named axis from opposite sides.

4. In a speed selecting device, a shifting lever having a hub portion, oppositely projecting lever portion, and a hollow conical portion projecting from the hub portion at about right angles to the lever portions.

5. In a speed selecting device, a shifting lever embodying a hub with actuating and neutralizing portions extending radially from the hub, the neutralizing portion having a conical actuating face with its narrower end in the termination of the neutralizing portion.

6. In a speed selecting device, selecting and neutralizing rods, a selecting disc having apertures adapted to be in alignment with the selecting and neutralizing rods and adapted to abut against one selecting and one neutralizing rod at a time.

7. In a speed selecting device, shifting levers, selecting rods, neutralizing rods, a selecting disc having apertures adapted to come into alignment with the said rods, a stem supporting the disc, a locking head on said stem having engaging means, and a locking member disposed to engage with the engaging means of the said head so as to hold the head with stem and disc in selected position while operated and adapted to free the head for allowing a turning and setting of the disc on the stem on withdrawing the disc from actuating the selecting rods.

8. In a speed selecting device, shifting levers, operating rods shiftably mounted in the direction of the shifting levers, a selecting mechanism including a selecting disc having perforations to allow the several operating rods to pass through the disk to remain unaffected by a forward moving of the disk and adapted to cause one of the operating rods at a time to abut against an unperforated portion of the disk thereby actuating one of the said levers, and locking means for holding the selecting mechanism in a selected position.

9. In a speed selecting device, shifting levers, operating rods shiftably mounted in the direction of the levers, neutralizing rods, and a selecting mechanism adapted to abut against one of the operating rods and one of the neutralizing rods at a time.

10. In a speed selecting device, shifting levers, operating means for the levers, neutralizing means for the levers, selecting means for the operating and neutralizing means rotatably mounted embodying a disk with perforations adapted to align with one member of each of said operating and neutralizing means at a time, and a locking means for holding the selecting means in selected position against rotation.

In testimony that we claim the foregoing as our invention we have signed our names.

VERNON W. BALZER.
JOHN McK. BALLOU.